July 13, 1965     W. E. McKEE     3,194,963
LIGHT INTENSITY MEASURING DEVICE AND METHOD USING
2-(2',4',-DINITROBENZYL)-PYRIDINE
Filed July 17, 1961     3 Sheets-Sheet 1
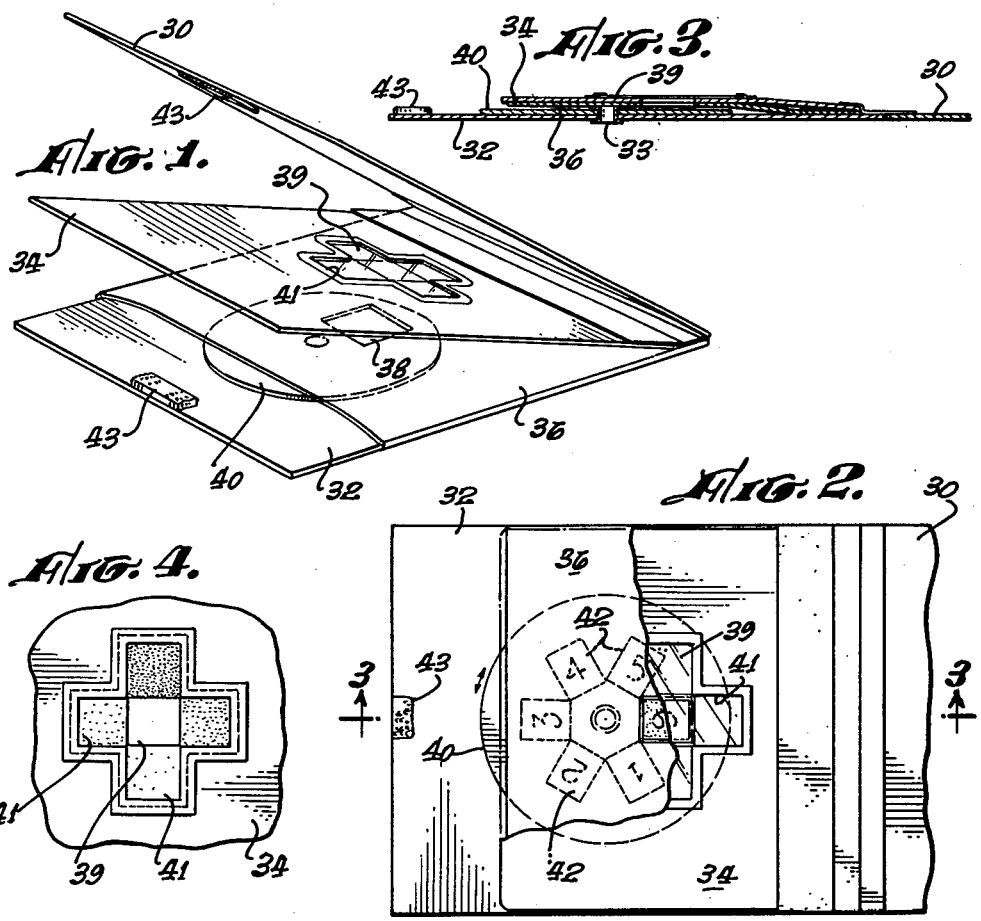
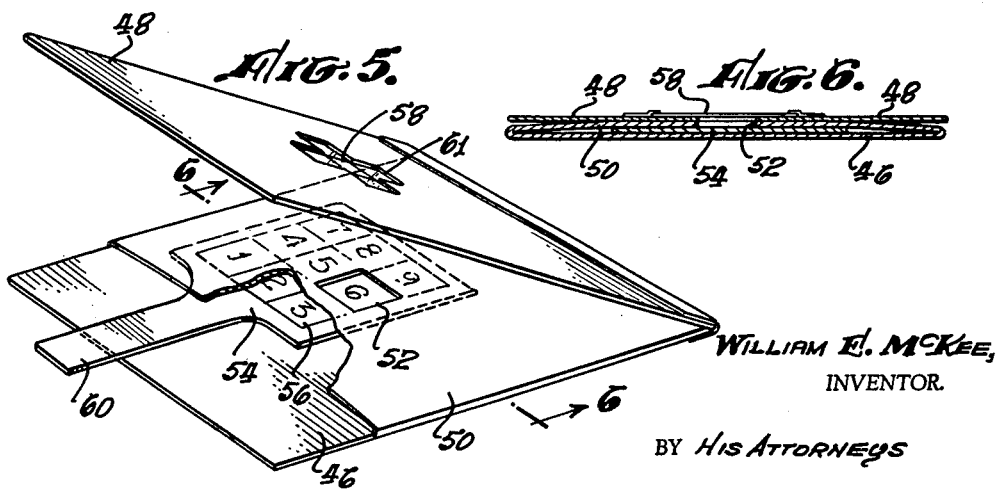
WILLIAM E. McKEE,
INVENTOR.
BY HIS ATTORNEYS
HARRIS, KIECH, RUSSELL & KERN

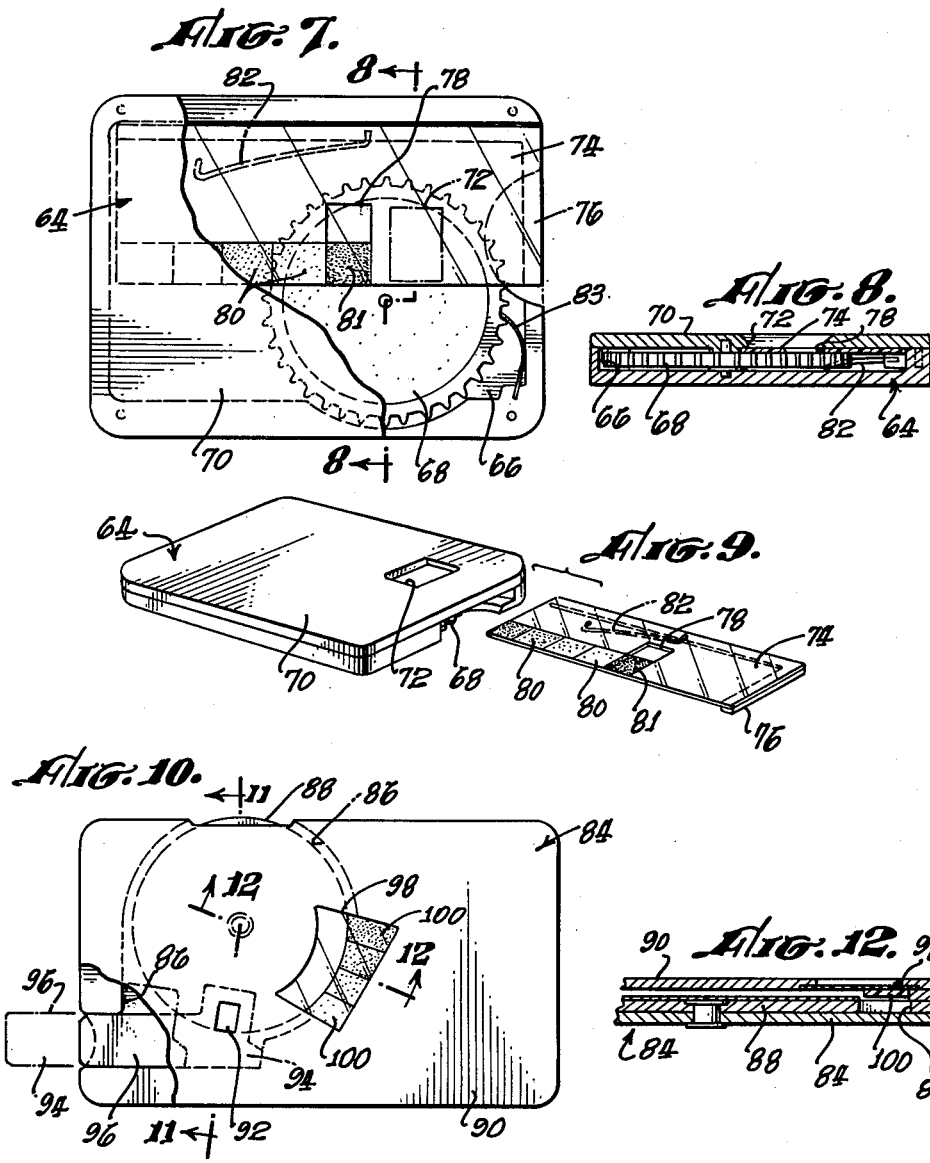

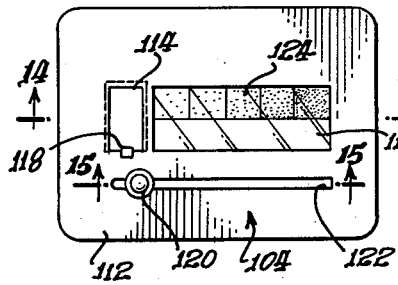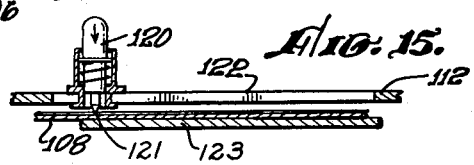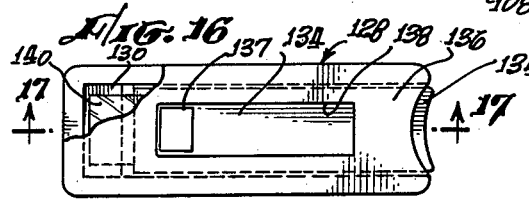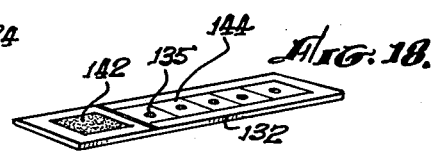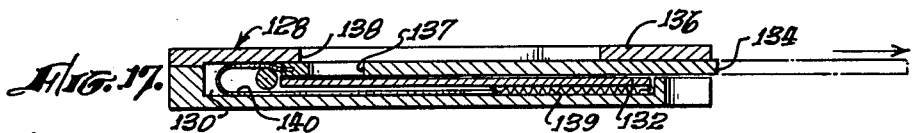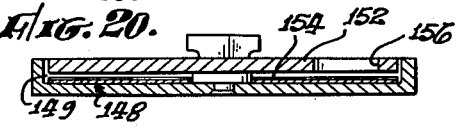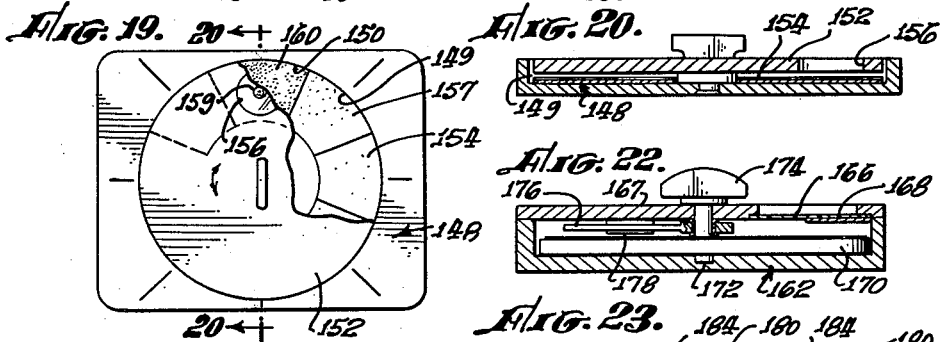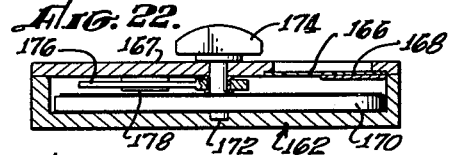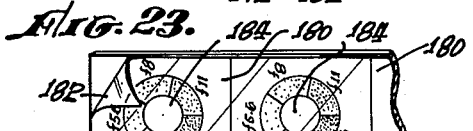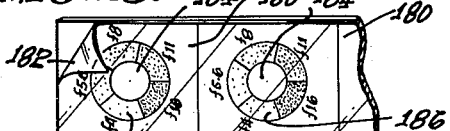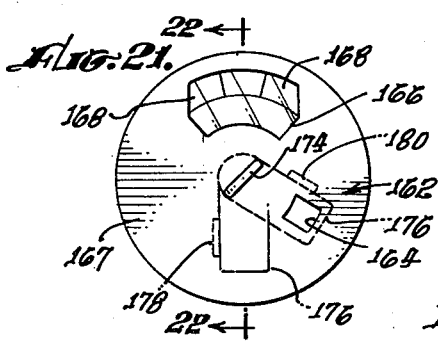

3,194,963
LIGHT INTENSITY MEASURING DEVICE AND METHOD USING 2 - (2',4' - DINITROBENZYL)-PYRIDINE
William E. McKee, Woodland Hills, Calif., assignor to Sundstrand Corporation, Rockford, Ill., a corporation of Illinois
Filed July 17, 1961, Ser. No. 124,452
9 Claims. (Cl. 250—83)

This invention relates to a photochemical process and device for measuring the intensity of light radiation, and more particularly the intensity of the ultraviolet component of such light.

It has now been discovered that a particular light sensitive material, namely 2-(2',4'-dinitrobenzyl)-pyridine in its solid form may be usefully employed for measuring light intensity. The characteristics of the pyridine compound which have been found to make it particularly adaptable for this use include its ability to gradually but rapidly assume a blue color at a rate proportional to the intensity of the light radiation and its property of retaining color for long periods of time after removal of light. For example, a period of about 20 seconds in relatively bright sunlight is required for the pyridine material to assume its full characteristic blue color. The color once assumed fades very slowly, overnight normally being required to restore a 2-(2',4'-dinitrobenzyl)-pyridine impregnated surface to its original colorless form. The pyridine material in its solid form has been found to have other properties that make it admirably suited for use in this respect. It is responsive to light rays of physiological interest; that is, the material is reactive to tanning and sunburning rays between 2800 angstroms and 4000 angstroms. The compound can be repeatedly exposed to direct sunlight for the short periods of time required to produce the desired color change. It will be appreciated that the slow fading property of the solid pyridine material enhances greatly its usefulness in the exposure meter and process of the invention since the developed color resulting from exposure may be leisurely compared to a series of standard colors which have been calibrated previously for known intensities of ultraviolet light. Color comparison can be made visually for periods up to about 15 minutes without significant loss of accuracy.

In the process of the invention the pyridine material in its solid form, usually in an impregnated surface, is exposed to ultraviolet irradiation for a predetermined time with the radiation being interrupted before the pyridine compound has reached its full characteristic blue color. Thereafter, the color of the exposed or developed compound is compared with color swatches having colors typical of different intensities of ultraviolet irradiation of the pyridine compound for the aforementioned predetermined length of time. The matching of the developed color with one of the standard color swatches provides a determination of how much ultraviolet light is present. It will be appreciated that a phototropic material which fades rapidly would be unsuited for use in the process of the invention. Furthermore, many phototropic materials lack the required stability and therefore could not be used repeatedly without the occurrence of an objectionable early decomposition.

Many people have difficulty in matching colors, particularly blue colors, and for this reason it has been found desirable to modify the blue color of the developed phototropic material to appear gray. Gray colors can be more readily matched by untrained people. The standards can then be made of various shades of gray which can be easily reproduced by a printing or photographic process. It has been found that a light orange, yellow or red filter (capable of absorbing light generally within the wave length range of 2800 to 5500 angstroms) formed either of plastic or glass, when laid over the developed blue compound will cause the blue color to appear gray. This gray color can then be matched easily to a series of permanent gray colors. Preferably, the reference colors (blue or gray) are matched to the developed blue color by viewing the colors simultaneously through the same light orange filter. However, it is possible, although not as accurate, to place standard gray color swatches beside the filtered developed color. It will be appreciated that hereinafter where light orange filters are mentioned that yellow or red filters may be used but generally less advantageously.

Another advantage in the use of the light orange filter has been experienced in that the depth of blue color does not increase during the color comparison process even where the comparison is made in bright sunlight. The pyridine compound is protected from active light by the orange filter which absorbs ultraviolet light and can be viewed and compared in a leisurely fashion. Color comparison will normally be done visually by an individual, but the comparison could be achieved with a commonly available photoelectric color comparing device. A clear transparency formed of a plastic film containing a colorless ultraviolet absorber may be used to arrest further color developement. Suitable colorless ultraviolet absorbers include 2,4-dihydroxybenzophenone and 2-hydroxy-4-methoxybenzophenone.

The use of the exposure meter of the invention gives an estimation of the amount of suntanning and sunburning rays which is present at any time in sunlight or in other ultraviolet light sources. The device is especially valuable for people bathing at the beach or other outdoor places as it will demonstrate the presence of sunburning rays even on a cool or cloudy day. The device will also disclose the presence of sunburning rays which may strike a person while resting in the shade. It will be appreciated that light may be reflected from nearby sand or water or other bright surfaces to strike a person supposedly guarded from the sun by a shade structure.

The standard color swatches against which the developed blue color is compared may be accurately calibrated in terms of calories per square centimeter per minute or other convenient units as camera lens openings, by the use of an instrument such as a radiation meter. The meter would be suitably filtered so that the light striking the sensitive light measuring surface will be only that of the range of interest, normally 2800 angstroms to 4000 angstroms. It has been found that a relationship exists between a photographic emulsion and the phototropic compound in the ratio of magnitude of radiant flux times the sensitivity of the phototropic material in the near ultraviolet region to the magnitude of radiant flux times the sensitivity of the photographic emulsion in the visible region. It is this latter relationship that permits the use of the light exposure device of the invention with cameras as an aid in determining proper lens settings.

The light exposure device may take many forms. It generally comprises a light sensitive member impregnated with solid 2-(2',4'-dinitrobenzyl)-pyridine which impregnated light sensitive member is contained within a housing or body member. Usually the body member has a window and means are provided permitting exposure of different portions of the impregnated light sensitive member to the view of the window. Conveniently the light sensitive member is circular and is pivotally held within a cavity of the body member. With this latter arrangement succeeding portions of the light sensitive member may be moved into view of the window by rotation of the circular member.

In still another embodiment of the device of the invention for measurement of light intensity, there is provided a body member comprising an outer cover hinged to a back cover with a pocket formed of sheet material placed on the inside face of the back cover. The exposure meter in this version resembles a book. The sheet material of the pocket has an opening serving as a window. The light sensitive member which is impregnated with the solid pyridine compound is movably held within the pocket of the body member and means are provided permitting movement of the light sensitive member to place different portions of its impregnated surface within the view of the window of the pocket. The standard color swatches may be incorporated into the structure of the body member or separately provided on an accompanying color scale for use with the light exposure device proper. In one modification of the book version, the outer cover of the hinged body member is provided with a window of a light orange, yellow, or a red transparency which is located in alignment with the window of the pocket carried by the back cover. The comparative color swatches may be conveniently located immediately adjoining the window of the outer cover and are preferably covered with the same light orange, or other colored transparency. In the use of this device the front cover is swung away from the back cover exposing a limited area of the light sensitive member to light irradiation through the window of the pocket. When the light sensitive member has been exposed to radiation for the length of time used in the exposure of the calibrated color swatches, the front cover is closed over the back cover forestalling further irradiation but still permitting viewing of the developed color of the light sensitive member through the light orange transparent window of the outer cover. A comparison of the color intensity of the developed area with the color swatches will reveal the intensity of the light radiation. In another form of the book version of the exposure device of the invention, the light orange transparent window is carried by an intermediate leaf member that is hinged to the body member and placed between the outer and back covers. In this latter embodiment the outer cover is solid, containing no window.

In still another form of the exposure device of the invention, there is provided a body member having a cavity and a first and a second window opening into the cavity. The second window contains a light orange (or other suitable color) transparency and means are provided for opening and closing the first window. The light sensitive member is circular and is pivotally mounted along its center axis within the body member. A portion of the outer perimeter of the circular light sensitive member reaches beyond the body member, providing a surface for manual movement of that member. The light sensitive member is so located within the cavity that succeeding portions of it are transferred from the view of one window to the view of the other window upon rotation of the circular member. Color swatches are located within the cavity of the body member immediately adjoining the circular light sensitive member and within the view of the second window. The light orange transparency covers the swatches.

The light sensitive member may be conveniently formed of a white, absorbent, imbibing paper such as a filter paper in which the pyridine compound has been dispersed. As a first step, a solution of say 0.1% to 10% of 2-(2',4'-dinitrobenzyl)-pyridine and acetone or other suitable polar solvent is prepared. The filter paper is immersed in the solution briefly, removed, and dried immediately by blowing warm air over the surface. It has been found that the rapid drying step is important as it prevents migration and consequent concentration of the pyridine material at the edges of the paper during drying.

The filter absorbent paper is then cut to the form required for the particular device. Where the light sensitive member is circular and is mounted along its pivot axis, it is desirable that the impregnated filter paper be mounted on a circular disc of cardboard to provide the needed structural stiffness.

It will be appreciated that the exposure window of an exposure meter may be covered with one of various filters, depending upon the wave length of the light that it is desired to measure between 2800 and 4000 angstroms. Sunlight at the earth's surface ordinarily contains a negligible amount of light in the spectrum below 2800 angstroms. The foregoing filter may be left permanently in place, if it is a fairly light yellow, as it will not alter the color of the test area (the developed or exposed area of the light sensitized surface) when compared to the standard as seen through the light orange filter discussed earlier.

For measuring approximate sunburning ray strength, a filter passing, for example, from 2800 to 3200 angstroms may be used. For measuring tanning rays, a filter passing 3200 to 3600 angstroms, for example, is employed. For measurement over the complete range to 4000 angstroms to which the pyridine material is active, no filter is used.

If it is desired to increase the time required to develop a given intensity of color of the solid pyridine material, it is possible to cover the exposure window of the device with a filter to cut down the amount of light reaching the pyridine compound. Ultraviolet absorber, such as 2,4-dihydroxybenzophenone in smaller concentrations may be used for this purpose (larger concentrations would completely absorb). This may be a neutral filter absorbing over the entire 2800 angstrom-4000 angstrom range or it may be a filter absorbing at any part of the range previously discussed.

It has been found that the addition of boric acid to the crystalline pyridine compound will significantly affect the rate of fading of the colored form. In particular the addition of boric acid has been discovered to decrease the rate of fading of the pyridine compound under a variety of conditions. The pyridine compound has been shown to fade more slowly over a range of at least —80° C. to 95° C. on filter paper that has been impregnated with boric acid than on untreated filter paper. This decrease in the fading rate occurred both with papers impregnated with boric acid prior or subsequent to the impregnation of the pyridine compound. The paper can be impregnated with boric acid conveniently by imbibing with aqueous boric acid solutions and then evaporating off the water. Solutions of 1% concentrations of boric acid are suitable for impregnating the paper.

The foregoing objects, advantages, features and results of the present invention, together with various other objects, advantages, features and results thereof, which will become apparent to those skilled in the art in light of this disclosure, may be achieved with the exemplary embodiments of the invention described in detail hereinafter and illustrated in the accompanying drawings.

In the drawings:

FIG. 1 is an isometric view of one embodiment of the light exposure meter of the invention which takes the form of a book having an outer cover, a back cover, and an intermediate leaf;

FIG. 2 is a fragmentary plan view of the exposure meter of FIG. 1 with the outer cover in its open position;

FIG. 3 is a longitudinal sectional view taken along line 3—3 of FIG. 2;

FIG. 4 is a plan fragmentary view of a centrally located window in the intermediate leaf;

FIG. 5 is an isometric view of another form of the exposure meter of the invention of the general book type structure illustrated in FIGS. 1–4 inclusive;

FIG. 6 is a cross-sectional view taken along line 6—6 of FIG. 5 with the exposure meter closed;

FIG. 7 illustrates still another form of the exposure meter of the invention of a box type having a rotatable circular light sensitive member and a slidable transparent member;

FIG. 8 is a cross-sectional view taken along line 8—8 of FIG. 7;

FIG. 9 is an isometric view of the device of FIG. 7 with the slidable transparent member removed therefrom;

FIG. 10 illustrates still another modification of a box type exposure meter of the invention which is provided with two windows with the larger of the two windows containing a light orange transparency;

FIG. 11 is a cross-sectional view taken along line 11—11 of FIG. 10;

FIG. 12 is a sectional view taken along line 12—12 of FIG. 10 through the larger window;

FIG. 13 is a plan view of another embodiment of the exposure meter of the invention, this embodiment having a box shape and being provided with an endless light sensitive tape member;

FIG. 14 is a longitudinal sectional view taken along line 14—14 of FIG. 13;

FIG. 15 is another longitudinal sectional view taken along line 15—15 of FIG. 13;

FIG. 16 is a plan view, partially cut away, of another version of the box type exposure meter of the invention;

FIG. 17 is an enlarged longitudinal sectional view taken along line 17—17 of FIG. 16;

FIG. 18 is an isometric view of the light sensitive member of the device of FIG. 16;

FIG. 19 is a simplified version of the exposure meter of the invention comprising a rotatable circular closure having a window which closure overlies a fixed light sensitive member contained within the cavity of the device;

FIG. 20 is a cross-sectional view taken along line 20—20 of FIG. 19;

FIG. 21 is a plan view of still another form of the exposure meter of the invention;

FIG. 22 is a cross-sectional view taken along line 22—22 of FIG. 21; and

FIG. 23 is a plan view of another form of the device of the invention, taking the form of a segmented strip of sensitized paper which is particularly useful in photography.

The exposure meter illustrated in FIGS. 1–4 inclusive is of the book form and comprises an outer cover 30 which is hinged along its rear edge to a back cover 32 with an intermediate leaf 34 between the two covers 30 and 32. In the embodiment illustrated the intermediate leaf 34, which is formed of opaque material, is actually hinged to the upper portion of the back cover 32, as best seen in FIG. 1. Both the outer cover 30 and back cover 32 are formed of opaque material, which may be cardboard surfaced with a plastic composition. The inner face of the back cover 32 is provided with a pocket 36 made of black paper or a transparent plastic containing enough ultraviolet absorbing material or orange dye to prevent color change. The inner wall of the pocket 36 has a centrally located window 38. A light sensitive wheel 40 made of white filter paper impregnated with solid 2-(2',4'-dinitrobenzyl)-pyridine is held to the back cover 32 about a pivot 33 and is disposed within the pocket 36. As best seen in FIG. 2, the wheel 40 carries six marked areas 42 that may be successively positioned within the view of the window 38 of the back cover 32. It will be noted that the wheel 40 extends below the lower edge of the pocket 36 providing a surface for manual rotation of the wheel. A window 39 in the intermediate leaf 34 is covered with a light orange transparency preferably made of plastic. Each side of the window 39 of the intermediate leaf 34 is bordered by a color swatch 41, each of the four swatches 41 being covered by the same light orange transparency that covers the window. Each of the swatches 41 has been calibrated previously for known intensity of ultraviolate for a given period of time. The light sensitive wheel 40 with both the outer cover 30 and intermediate leaf 34 in their full open positions is exposed to sunlight or other ultraviolet containing light for the same period of time as used in calibrations of the swatches. At the end of the calibrated time interval, the intermediate leaf 34 is placed over the pocket 36 of the back cover 32, placing the light orange window 39 directly over the window 38 of the pocket. As earlier explained, the light orange transparency protects the light sensitive wheel against further development of the blue color. The use of the light orange window permits the developed color of the light sensitive wheel to be matched in a leisurely fashion with the several swatches. The use of the light orange filter overlying both the color swatches and the developed blue area of the light sensitive wheel also facilitates color matching since the blue appears as gray through the orange filter. While in the embodiment described the color swatches 41 are actually blue, it is possible to use permanent gray colors of the proper depth beneath the light orange filter for matching purposes. A suitable latch 43 is used for releasably locking the two covers 30 and 32 of the exposure meter together.

The exposure meter of FIGS. 5 and 6 is another form of the general book type illustrated in FIGS. 1–4 and comprises a back cover 46 which is hinged to a front cover 48. As in the earlier embodiment, the back cover 46 is provided with a pocket 50 formed of black paper or transparent plastic containing an ultraviolet absorber. The pocket carries a centrally placed window 52. The light sensitive member in this device takes the form of a paddle 54 which has a grid of marked areas 56 that are designed to be individually positioned in the view of the window 52. A handle 60 of the paddle 54 reaches beyond the dimensions of the pocket 50. The paddle 54 is preferably light sensitive on both sides and can be drawn from the pocket and turned over to present fresh light sensitive areas 56 in view of the window 52. Unlike the earlier embodiment, the exposure meter of FIGS. 5 and 6 has no intermediate leaf and a light orange window 58 is provided in the central portion of the front cover 48. As before, the window 58 is in alignment with the window 52 of the pocket 50 when the front cover 48 is closed. The light orange pane of the window 58 blocks further development of the light sensitive areas 56. As in the embodiment of FIG. 1, color swatches 61 are located immediately adjacent each side of the window 58 and beneath the light orange transparency.

The exposure meter illustrated in FIGS. 7–9 inclusive is of the box type and comprises a body member 64 which is a shell having a cavity 66 in which there is pivotally mounted a circular light sensitive wheel 68 which has a surface formed of white filter paper impregnated with solid 2-(2',4'-dinitrobenzyl)-pyridine. A side 70 of the body member 64 (FIG. 9) has near one of its edges a window 72 overlying the light sensitive wheel 68. A slide member 74 made of light orange transparent plastic is disposed between the light sensitive wheel 68 and the window 72 of the side 70. In the view of FIG. 9 the slide 74 is removed from the device proper. The slide 74 at its outer end has a grasp bar 76 glued to its undersides. The transparent slide 74 centrally of its length is provided with a window 78 and along one of its edges beginning at the rear end of the slide there is a series of color swatches 80. The color swatches are suitably glued to the underside of the transparent slide 74. Area 81 adjoining the window 78 is not a color swatch but is rather a blacked out area. A wire spring 82 is affixed to the underside of the slide 74 and as slide 74 of FIG. 9 is returned to its closed position of FIG. 7, spring 82 engages the teeth on the wheel 68, turning it to present a fresh light sensitive area beneath the window 72.

As best seen from a study of the cutaway view of FIG. 7, the window 78 of the transparent slide 74 when moved into alignment with the larger window 72 (indicated in phantom lines in FIG. 7) occupies the upper half of the window 72. In using the exposure device of FIGS. 7–9, the light sensitive wheel 68 has a patch of its sensitive surface exposed to sunlight through the aligned windows 72 and 78 for the calibrated length of time. Following this the slide 74 is moved to place the light orange transparency between the sunlight and the developed area of the wheel 68. By movement of the slide back and forth along the length of the series of swatches 80, the developed area of the wheel 68 may be compared with the swatches to learn which one of the several swatches 80 matches the developed area. A detent spring 83 which engages a serrated edge of the light sensitive wheel 68 serves to avoid unintentional or accidental movement of the wheel 68.

The exposure meter of FIGS. 10–12 includes a body member 84 having a cavity 86 in which a light sensitive wheel 88 is pivotally mounted. A side 90 of the body member 84 is provided with a small first window 92 overlying the outer edge of the light sensitive wheel 88. A slidable opaque closure 94 positioned between the wheel 88 and the side 90 is provided for opening and closing the view of the first window 92. The closure 94 has a handle 96 graspable from the exterior of the device, the handle being used for movement of the closure. A second and larger window 98 is positioned in the side 90 close to the first window and disposed on substantially the same circle relative to the center of the light sensitive wheel 88. This relative location of the two windows 92 and 98 permits movement of succeeding portions of the light sensitive wheel 88 from the view of one window to within the view of the other window. The second window 98 has a pane of light orange transparent plastic and has glued to its inside surface a series of color swatches 100 immediately adjoining the perimeter of the light sensitive wheel 88. One edge of the device is cut away to expose a portion of the perimeter of the light sensitive wheel 88, thus providing a surface for manual movement of the wheel. In using the device, the handle 96 of the closure 94 is pulled out to permit direct impingement of the sunlight on the sensitized surface of the wheel 88. After exposure for the calibrated time, the opaque closure 94 is closed, and the developed area of the light sensitive wheel 88 is moved into view of the second window 98 where its color is compared through the light orange transparency with the several swatches 100.

The device of FIGS. 13–15 covers another form of the box type exposure meter of the invention and includes a shell-like body member 104 which houses in its cavity 106 an endless light sensitive tape 108 carried by two spaced, transverse pins 110. The front face 112 of the body member 104 has two spaced windows 114 and 116, both of which are normally closed by a light yellow transparent pane. The window 114, the smaller of the two, may be opened by grasping a handle 118 and moving the transparent pane of the window upwardly to expose the underlying light sensitive tape 108 to sunlight. Following exposure of the light sensitive tape 108 for the calibrated time, the tape is moved longitudinally of the device to place the developed area in view of the second window 116 by grasping a handle 120 affixed to the tape and moving the handle lengthwise of a slot 122 formed in the front face 112. The handle 120 which has a point 121 is spring loaded out of contact with the underlying tape 108. The point 121 may be brought into engagement with the tape 108 by depressing the handle to overcome the spring. A strip of the tape 108, immediately below the slot 122 is reinforced with a perforated pressure sensitive tape material. The tape 108 is supported over a backup plate 123. Several color swatches 124 are held to the underside of the transparent pane of window 116. As before, the intensity of the sunlight or other ultraviolet containing radiation is determined by matching the developed area with the swatches 124. After the developed area has been matched with the swatches 124 the handle 120 is released and the spring disengages the handle point 121 from the tape.

With reference to FIGS. 16–18, there is illustrated an elongated shell-like body member 128 which contains within a cavity 130 a fixed light sensitive strip member 132. The light sensitive strip 132 is positioned intermediate the depth of the cavity 130. The light sensitive strip 132 has a surface impregnated with solid 2-(2′,4′-dinitrobenzyl)-pyridine and a design 135 such as a colored circle printed in the center of each marked sensitized area 144. A slide 134 formed of an opaque material and having a window 137 adjacent its inner end is slidably held between the fixed light sensitive strip 132 and a top 136 of the device. The top 136 has an elongated opening 138 through which the slide 134 and its window 137 may be viewed. The inner end of the slide 134 has affixed to it a flexible strip 140 of a light orange plastic transparency, the end of which is affixed to a positioning spring 139 which returns the slide to closed position. It will be seen that continued movement of the slide 134 eventually brings the light orange strip 140 into view of the opening 138 of the top 136. In using the device of FIGS. 16–17, the window 137 of the slide is moved beyond an unsensitized darkened area 142 of the strip 132 to an overlying position with respect to one of several marked sensitized areas 144 towards the outer end of the fixed light sensitive strip 132. The selected marked area 144 is exposed for the time it takes the selected sensitized area 144 to match the color of the design 135 and then the light orange flexible strip 140 is drawn over the exposed area to forestall further development of that area. The time required for the sensitized area 144 to match the color intensity of the design is a measure of light intensity. In the particular embodiment illustrated no color swatches are provided within the device itself. The central design 135 may be eliminated and comparative color swatches placed along one edge and against the underside of the amber flexible strip or in an alternative the swatches may be provided on a companion chart to be used with the illustrated device.

The exposure meter of FIGS. 19 and 20 comprises a body member 148 which has a recessed circular area 149 into which a rotatable, opaque, circular closure 152 fits. An annulus 154 of light sensitive material is glued to the bottom of the recessed area 149 immediately below the rotatable closure 152. The closure 152 has a window 156 through which succeeding marked areas 157 of the sensitized surface of the light sensitive annulus 154 may be exposed to sunlight or other ultraviolet radiation. In the embodiment of FIGS. 16–17, a central colored design 159 is printed in the center of each sensitive area 157, which is exposed for the time it takes to effect a match of the color depths. The light sensitive annulus 154 has an unsensitized, blacked-out area 160 over which the window may be located in its closed position.

The exposure meter of FIGS. 21 and 22 comprises a circular shell 162 having two spaced windows 164 and 166 in its top 167, the latter window containing a light orange transparent pane which is provided along one of its edges with three or more comparative swatches 168. The first window 164 has no pane. A circular light sensitive wheel 170 is fixed to the lower end of a rotatable shaft 172 which may be turned by a handle 174 at its outer end. The shaft 172 carries centrally along its length a frictionally engaged shutter 176, which is movable between two stops 178 and 180 affixed to the underside of the top 167. The shutter 176 is limited in its movement between the two stops and with counterclockwise rotation of the handle 174 the shutter 176 moves to close the window 164 to view, protecting the underlying light sensitive wheel 170 from the sunlight. Further counterclockwise rotation of the light sensitive wheel 170 will move the previously exposed area of the wheel into the view of the light orange window 166 where it may be compared with the several swatches 168. With clockwise rotation of the handle 174 the shutter 176 leaves the area of the first window 164 and comes shortly into engagement with stop 178. It will be appreciated that, as before, while the shutter 176 is blocked against further movement, the handle 174 may nevertheless be turned further in the clockwise direction to expose succeeding portions of the light sensitive wheel.

The embodiment of FIG. 23 is designed particularly for use in photography to obtain proper lens opening (f number) for the ambient light intensity. It has been established that the incidence of near ultraviolet (which is readily measured by the device of the invention) is proportional to the intensity of the visible light. This being so, it is possible to relate time of exposure or lens openings (f numbers) to the reading obtainable from the strip device of FIG. 23. The strip device is simple in structure and comprises perforated paper segments 180, each of which has an overlying transparent film 182 which contains an ultraviolet absorber, e.g., 2,4-dihydroxybenzophenone. The strip proper has in each segment 180 a centrally located filter paper disc 184 impregnated with solid 2-(2',4'-dinitrobenzyl)-pyridine. Several comparative swatches 186 are located radially around the sensitized disc 184. The strip device may be conveniently wound about a roll of photographic film at time of sale. In use the clear plastic film 182 is peeled back, exposing the first segment 180 to sunlight. The disc 184 of this segment is faced toward the camera. At the end of a predetermined period, the brilliance of the developed disc 184 is compared with the encircling color swatches 186 to select the swatch which most nearly matches the color of the developed disc 184. The swatches 186 are marked for lens openings (f numbers) based upon a standard camera exposure time of say 1/50 second. An exposure conversion table for other camera exposure time and for indoor photography with photoflood lamps may be printed on the back of the strip device. Lens opening corrections for exposures on cloudy days and in the shade may also be included.

It will be understood that during the comparison of the developed disc 184 and the color swatches 186, the overlying transparent film 182 is placed over the disc 184 to arrest further color development.

It may be desirable to slow down the development of the blue color of the pyridine material, for instance on a normally bright sunny day where for example only a very short time, say two or three seconds is required to reach the range of the color density that may be acquired in say ten seconds on a less bright day. Exposure of the pyridine material for the full ten seconds in bright sun may place the resulting color density beyond the linear light intensity-color density scale encountered on a less bright day. The interposing of a film between the sun and sensitized pyridine paper which absorbs the proper proportion of ultraviolet light can increase the time required to reach the desired color density range to ten seconds or other desired time. Such a film may be used profitably with the several devices already given as examples. It has been found that a cellulose acetate film 0.0018" thick containing 0.5% by weight of 2,2',4,4'-tetrahydroxybenzophenone placed over a sensitized pyridine paper will extend the period required to reach a desirable color range in bright sunlight to 10 seconds compared with two or three seconds in the absence of the film. Other ultraviolet absorbing materials may be used to the same advantage.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A device for measurement of light intensity comprising:
 a body member having an outer cover hinged to a back cover, with a pocket formed of sheet material being provided on the inside face of said back cover, said sheet material of the pocket having an opening serving as a window;
 a light sensitive member, including a substantially white surface impregnated with solid 2-(2',4'-dinitrobenzyl)-pyridine, movably held within the pocket of said body member, said pyridine material upon exposure to ultraviolet radiation acquiring a blue color, the intensity of which is dependent upon light quantity;
 color swatches positioned adjacent the window of the pocket, said color swatches having color intensities typical of differing degrees of ultraviolet radiation of said pyridine material;
 means permitting movement of the light sensitive member to place different portions of its impregnated white surface within the view of the window of the pocket; and
 said body member being provided with an intermediate leaf member that is hinged along one of its edges to the body member, said intermediate leaf member including a window covered with a transparency capable of absorbing light within the wave range of 2800 to 5500 angstroms in alignment with the window of the pocket, with the color swatches being disposed immediately adjacent the window of the intermediate leaf member and being covered with said transparency.

2. An exposure meter comprising:
 a body member having a first window;
 a circular light sensitive member having a substantially white surface impregnated with solid 2-(2',4'-dinitrobenzyl)-pyridine, said circular light sensitive member being housed within the body member away from light;
 means permitting exposure of successive portions of the light sensitive member to the view of the first window of the body member;
 said circular light sensitive member being pivotally mounted about its central axis within the body member and wherein the body member is provided with a second window covered by a tranparency capable of absorbing light in the wave range of 2800 to 5500 angstroms, said second window being spaced from the first window and lying on substantially the same circle relative to the center of the light sensitive member as the first window, thus permitting movement of succeeding portions of the light sensitive member from the view of one window to within the view of the other window; and
 color swatches having color intensities typical of different degrees of ultraviolet radiation of said pyridine material placed immediately adjoining the second window of the body member, said color swatches being covered with said transparency.

3. A process for measuring light intensity comprising:
 exposing 2-(2',4'-dinitrobenzyl)-pyridine in its solid form to an ultraviolet-containing radiation, said pyridine compound upon exposure to ultraviolet light acquiring a blue color, the intensity of which is dependent upon light quantity;
 interrupting exposure of said pyridine compound before it has reached its full characteristic blue color; and
 comparing the color of the exposed pyridine compound with color swatches having colors typical of different degrees of ultraviolet radiation, said comparison being made after placing a transparency capable of absorbing light in the wave range of 2800 to 5500 angstroms over the pyridine compound and the color swatches.

4. A process for measuring light intensity comprising:
 exposing 2-(2',4'-dinitrobenzyl)-pyridine in its solid form to an ultraviolet-containing radiation, said pyridine compound upon exposure to ultraviolet light acquiring a blue color, the intensity of which is dependent upon light quantity;

interrupting exposure of said pyridine compound before it has reached its full characteristic blue color;

comparing the color of the exposed pyridine compound with color swatches having colors typical of different degrees of ultraviolet radiation; and said pyridine compound having associated with it boric acid, said boric acid serving to decrease the rate of fading of the blue color.

5. A device permitting measure of light intensity comprising:

a body member having a window;

a light sensitive member impregnated with solid 2-(2',4'-dinitrobenzyl)-pyridine, said light sensitive member being housed within the body member;

means permitting exposure of at least a portion of the impregnated surface of the light sensitive member to the view of the window;

color swatches positioned adjacent the window of the body member, said color swatches having color intensities typical of different degrees of ultraviolet radiation of said pyridine compound; and a transparency associated with the device capable of absorbing light within the wave range of 2800 to 5500 angstroms in alignment with the window having the color swatches thereabout, said transparency being of a size sufficient to cover the window and said swatches.

6. A device for measurement of light intensity comprising:

a body member having an outer cover hinged to a back cover, with a pocket formed of sheet material being provided on the inside face of said back cover, said sheet material of the pocket having an opening serving as a window;

a light sensitive member, including a substantially white surface impregnated with solid 2-(2',4'-dintrobenzyl)-pyridine, movably held within the pocket of said body member, said pyridine material upon exposure to ultraviolet radiation acquiring a blue color, the intensity of which is dependent upon light quantity;

color swatches positioned adjacent the window of the pocket, said color swatches having color intensities typical of differing degrees of ultraviolet radiation of said pyridine material;

means permitting movement of the light sensitive member to place different portions of its impregnated white surface within the view of the window of the pocket; and said outer cover of the body member being provided with a window covered with a transparency capable of absorbing light within the wave range of 2800 to 5500 angstroms in alignment with the window of said pocket, with the color swatches being located immediately adjoining the window of the outer cover and being covered with said transparency.

7. An exposure meter comprising:

a body member having a cavity and a first and a second window opening into said cavity, said second window containing a transparency capable of absorbing light in the wave range of 2800 to 5500 angstroms, and the first window being provided with means permitting its opening and closing to the cavity;

a circular light sensitive member having a substantially white surface impregnated with solid 2-(2',4'-dintrobenzyl)-pyridine pivotally mounted along its center axis within said body cavity with an outer portion of the body member being open to expose at least a portion of the outer perimeter of said circular light sensitive member, thus providing a surface for manual movement of said light sensitive member, said light sensitive member being so located within the cavity that succeeding portions of said light sensitive member are transferred with movement of that member from the view of one window to the view of the other window; and color swatches having color intensities typical of different degrees of ultraviolet radiation of said pyridine material spaced immediately adjoining said circular light sensitive member within the view of said second window and with said transparency also covering said swatches.

8. An exposure meter comprising:

a body member having a cavity and a window opening into said cavity;

a light sensitive member impregnated with solid 2-(2'-4'-dinitrobenzyl)-pyridine pivotally held within said cavity to permit movement of successive portions of the light sensitive member past the view of the window;

a slide member formed of a transparent material capable of absorbing light in the wave range of 2800 to 5500 angstroms disposed between said window of the body member and the circular light sensitive member with one end of the slide being graspable from the exterior of the device, said transparent slide having a cutaway portion that permits direct impingment of light upon the light sensitive member through the window of the body member; and a series of color swatches affixed to one side of the slide member between said slide member and the light sensitive member, said color swatches upon movement of the transparent slide being exposed to the view of the window of the body member.

9. A light exposure meter comprising:

a body having a cavity therein and a first and a second window opening into said cavity, with both windows being covered by a transparency capable of absorbing light in the wave range of 2800 to 5500 angstroms, with means being provided to open at least partially the first window;

an endless strip of a light sensitive member impregnated with solid 2-(2',4'-dinitrobenzyl)-pyridine disposed within the cavity of the body member and movable between said two windows, said pyridine compound upon exposure to ultraviolet radiation acquiring a blue color, the intensity of which is dependent upon light quantity; and a series of color swatches located beneath and along one edge of the second window.

References Cited by the Examiner
UNITED STATES PATENTS

| | | | |
|---|---|---|---|
| 1,292,148 | 1/19 | Taylor | 250—86 |
| 2,258,593 | 10/41 | Black | 250—83 |
| 2,334,766 | 11/43 | Hermann | 250—86 |
| 2,680,816 | 6/54 | Stern | 250—83 |
| 2,682,510 | 6/54 | Taplin et al. | 252—408 |
| 2,876,210 | 3/59 | Wynn et al. | 252—300 |
| 2,949,880 | 8/60 | Fromer | 250—83 |
| 2,953,454 | 9/60 | Berman | 250—65 |
| 3,021,286 | 2/62 | Etzel et al. | 252—408 |
| 3,051,837 | 8/62 | Nitka | 250—86 |

OTHER REFERENCES

Clark et al.: "The Phototropic Properties of 2-(2':4'-Dinitrobenzyl)-Pyridine," Faraday Society Transactions, vol. 54, pp. 1790-1796.

Hardwick et al.: "Photochromotropic Behavior of 2-(2'-4'-Dinitrobenzyl)-Pyridine," Faraday Society Transactions, vol. 56, January-June 1960, pp. 44 to 50.

Nitka: "Photographic Methods," Nucleonics, October 1959, pp. 58–59.

RALPH G. NILSON, *Primary Examiner.*

ARCHIE R. BORCHELT, *Examiner.*